US009483692B2

(12) United States Patent
Kondou et al.

(10) Patent No.: US 9,483,692 B2
(45) Date of Patent: Nov. 1, 2016

(54) GESTURE RECOGNITION APPARATUS USING VEHICLE STEERING WHEEL, AND METHOD FOR RECOGNIZING HAND

(71) Applicants: NIPPON SYSTEMWARE CO., LTD., Tokyo (JP); HONDA ACCESS CORP., Saitama (JP)

(72) Inventors: Tsuyoshi Kondou, Tokyo (JP); Teruo Uchimura, Tokyo (JP); Shinichi Horisaki, Tokyo (JP); Atsuki Kakinuma, Saitama (JP); Toshiaki Hosogai, Saitama (JP)

(73) Assignees: NIPPON SYSTEMWARE CO., LTD., Tokyo (JP); HONDA ACCESS CORP., Niiza-Shi Saitama (JP)

( * ) Notice: Subject to any disclaimer, the term of this patent is extended or adjusted under 35 U.S.C. 154(b) by 116 days.

(21) Appl. No.: 14/372,137

(22) PCT Filed: Jan. 29, 2013

(86) PCT No.: PCT/JP2013/051839
§ 371 (c)(1),
(2) Date: Jul. 14, 2014

(87) PCT Pub. No.: WO2013/118608
PCT Pub. Date: Aug. 15, 2013

(65) Prior Publication Data
US 2015/0003682 A1  Jan. 1, 2015

(30) Foreign Application Priority Data
Feb. 7, 2012 (JP) .................................. 2012-023802

(51) Int. Cl.
*G06K 9/00* (2006.01)
*G06F 3/01* (2006.01)
*G06K 9/38* (2006.01)

(52) U.S. Cl.
CPC ........... *G06K 9/00389* (2013.01); *G06F 3/017* (2013.01); *G06K 9/00832* (2013.01); *G06K 9/38* (2013.01)

(58) Field of Classification Search
USPC ..................... 382/190, 171, 172, 237, 103
See application file for complete search history.

(56) References Cited

U.S. PATENT DOCUMENTS

2005/0238202 A1* 10/2005 Sato .................. G06K 9/00832
382/104
2010/0306699 A1* 12/2010 Hsu .................... G06K 9/00355
715/810

(Continued)

FOREIGN PATENT DOCUMENTS

JP  2005242694  9/2005
JP  2005250785  9/2005

(Continued)

OTHER PUBLICATIONS

Ohtsu, Nobuyuki. "A threshold selection method from gray-level histograms." IEEE Trans. Syst., Man, Cybern. 9.1 (1979): 62-66.*

*Primary Examiner* — Bhavesh Mehta
*Assistant Examiner* — Narek Zohrabyan
(74) *Attorney, Agent, or Firm* — Soroker Agmon Nordman

(57) ABSTRACT

A gesture recognition apparatus capable of recognizing a hand by means of a binary image regardless of direction of light contacting the hand. A binarizing processing section binarizes an input image from a camera to a hand recognizing section to prepare a first binary image by a predetermined method. A rebinarizing processing section only rebinarizes a predetermined area of the input image to prepare a second binary image. A contraction processing section performs a contraction processing on the second binary image. The rebinarizing processing can increase the possibility of recognizing the hand by classifying a portion of the hand that was classified into black in the first binary image into white. The hand is determined to be recognizable if the hand can be recognized in the first binary image and/or in the second binary image.

12 Claims, 7 Drawing Sheets

(56) References Cited

U.S. PATENT DOCUMENTS

| | | | | |
|---|---|---|---|---|
| 2011/0196240 A1* | 8/2011 | Mitani | ............... | G06K 9/00912 600/476 |
| 2011/0234840 A1* | 9/2011 | Klefenz | ............. | G06K 9/00375 348/222.1 |
| 2012/0062736 A1* | 3/2012 | Xiong | ..................... | G06F 3/017 348/143 |
| 2012/0105613 A1* | 5/2012 | Weng | ................. | G01C 21/3664 348/77 |
| 2013/0088422 A1* | 4/2013 | Niikura | ................. | G06F 3/0304 345/156 |

FOREIGN PATENT DOCUMENTS

| JP | 2007122274 | 5/2007 |
|---|---|---|
| JP | 2011150669 | 8/2011 |
| JP | 2012-201301 A | 10/2012 |

* cited by examiner

A

B

C

A

B

C

GESTURE RECOGNITION APPARATUS USING VEHICLE STEERING WHEEL, AND METHOD FOR RECOGNIZING HAND

CROSS-REFERENCE TO RELATED APPLICATIONS AND CLAIM TO PRIORITY

This application is a national stage application of International Application No. PCT/JP2013/051839 filed Jan. 29, 2013, which claims priority to Japanese Patent Application No. 2012-023802 filed Feb. 7, 2012, of which the disclosures are incorporated herein by reference and to which priority is claimed.

BACKGROUND OF THE INVENTION

1. Field of the Invention

The present invention relates to a gesture recognition apparatus for recognizing a position of a hand on a steering wheel from an image data by imaging a gesture (operation) using a steering wheel of a vehicle by an imaging device placed in the vehicle.

2. Description of the Related Art

Gesture remote-controllable operating devices using a steering wheel of a vehicle have been known wherein a driver's hand position on a steering wheel is imaged by a camera, and an operation processing is performed based on a position and a movement of the imaged hand. Gesture recognition apparatuses used in gesture remote-controllable operating devices image a driver's hand position on a steering wheel by a camera, and recognize the hand by processing the image data.

For example, Japanese Patent No. 3941786 discloses a device for outputting an operation command for on-vehicle equipments based on gestures of an operator, namely, positions and movements of his/her hand.

Japanese Unexamined Patent Application Publication No. 2007-122274 discloses a device for binarizing an image with uneven density in the background and extracting a sharper object to be detected from the binary image.

However, it is difficult to accurately read positions and movements of an operator's hand in the device disclosed in Japanese Patent No. 3941786. For example, a subtle difference in gestures made by different operators cannot be accurately recognized.

Furthermore, since the device disclosed in Japanese Unexamined Patent Application Publication No. 2007-122274 detects an object from an image with uneven density in the background, a steering wheel in the background will be free from uneven density when applied to a vehicle, and that it will be difficult to detect a position of an object, namely, a hand, from an image data imaged under an environment exposed to sunlight.

When an image data of a hand on a steering wheel imaged by a camera is binarized and the hand is recognized from the binary image, the lighted portion of the hand turns white and the non-lighted portion of the hand turns black in case that sunlight is incident from the front side of the hand, and that the hand is separated on the binary image. Also, the hand is separated on the binary image in case that the hand is lighted from the right rear side generating a lighted portion and a shaded portion on the hand. The hand may not be recognized in such cases.

Therefore, an object of the present invention is to provide a gesture recognition apparatus capable of recognizing a hand by means of a binary image regardless of direction of light contacting the hand.

SUMMARY OF THE INVENTION

According to one aspect of the present invention, a gesture recognition apparatus using a steering wheel of a vehicle includes imaging means disposed on a position capable of imaging a steering wheel and recognizing means for recognizing a position of a hand on the steering wheel based on an imaging data outputted from the imaging means. The recognizing means includes binarizing means for preparing a first binary image by binarizing the imaging data outputted from the imaging means by a predetermined method. The recognizing means further includes rebinarizing means for preparing a second binary image by determining a first possible area wherein the hand is imaged during making a gesture and a second possible area wherein a background is imaged during making a gesture on the imaging data, then determining a new threshold by a predetermined method merging the first and the second areas into one image, and then rebinarizing a predetermined area of the imaging data. The recognizing means further includes determining means for determining that the hand is recognizable if the hand can be recognized in the first binary image and/or in the second binary image.

The gesture recognition apparatus of the present invention can further include contraction processing means for performing a contraction processing on the second binary image.

Here, a discriminant analysis method or an adaptive binarizing processing is preferably applied as the predetermined method used in the binarizing means. Furthermore, a discriminant analysis method is preferably applied as the predetermined method used in the rebinarizing means.

According to one aspect of the present invention, a method for recognizing a hand on a steering wheel of a vehicle based on an imaging data outputted from imaging means disposed on a position capable of imaging the steering wheel during making a gesture using the steering wheel includes preparing a first binary image by performing a binarizing processing on an imaging data outputted from the imaging means by a predetermined method. A first possible area wherein the hand is imaged during making a gesture and a second possible area wherein a background is imaged during making a gesture are determined on the imaging data, then a new threshold is determined by a predetermined method merging the first and the second areas into one image, and then a second binary image is prepared by rebinarizing a predetermined area of the imaging data. The hand is determined to be recognizable if the hand can be recognized in the first binary image and/or in the second binary image.

The method for recognizing a hand of the present invention can further include performing a contraction processing on the second binary image.

Here, a discriminant analysis method or an adaptive binarizing processing is preferably applied as the predetermined method used in preparing the first binary image. Furthermore, a discriminant analysis method is preferably applied as the predetermined method used in preparing the second binary image.

According to the gesture recognition apparatus using a steering wheel of a vehicle of the present invention, only a predetermined area of a binary image of an imaging data is further rebinarized at a different threshold, thereby portions of the back of a hand and fingers classified into black in the first binary image depending on a condition of illumination will be classified into white, and that the back of the hand and the fingers can be merged in the binary image. Thereby, a hand can be recognized in a binary image.

Furthermore, a contraction processing is applied onto a rebinarized binary image in the present invention. A background, the back of a hand, and fingers may be merged if a portion of the background is classified into white at rebinarization, however, the possibility of merging can be reduced by performing a contraction processing.

Moreover, only a predetermined area, not a whole image, is rebinarized in the present invention, thereby a processing load of an apparatus can be suppressed.

According to the method for recognizing a hand on a steering wheel of a vehicle of the present invention, only a predetermined area of a binary image of an imaging data is further rebinarized at a different threshold, thereby portions of the back of a hand and fingers classified into black in the first binary image depending on a condition of illumination will be classified into white, and that the back of the hand and the fingers can be merged in the binary image. Thereby, a hand can be recognized in a binary image.

DETAILED DESCRIPTION OF THE
EXEMPLARY EMBODIMENTS OF THE
INVENTION

A gesture recognition apparatus using a steering wheel of a vehicle according to the present invention is an apparatus for recognizing a hand of a driver on a steering wheel by a binary image obtained by binarizing an imaging data of the steering wheel imaged with imaging means such as a camera. A detailed description will be given below, of the embodiments of an operating apparatus of a gesture recognition apparatus using a steering wheel of a vehicle of the present invention with reference to attached drawings.

Figure 1:
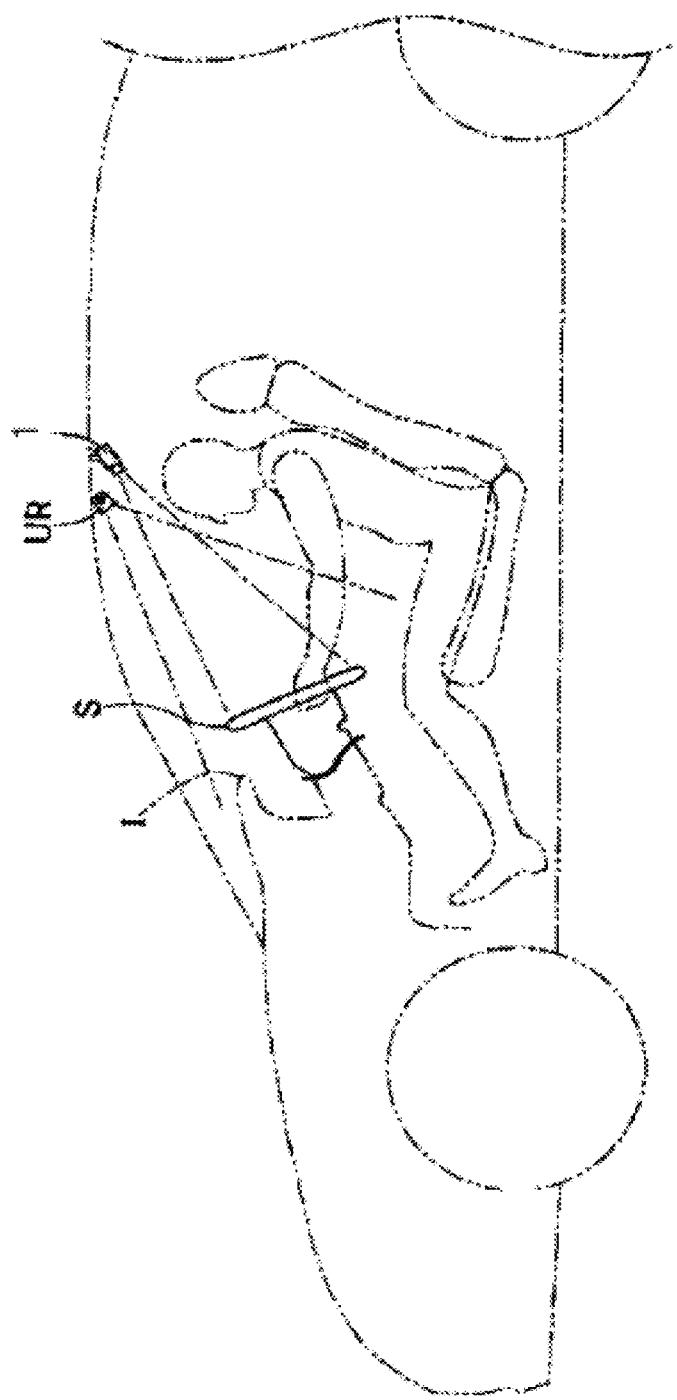
FIG. 1 is a schematic view of an interior of a vehicle according to an embodiment of a gesture recognition apparatus using a steering wheel of a vehicle of the present invention.
Figure 2:
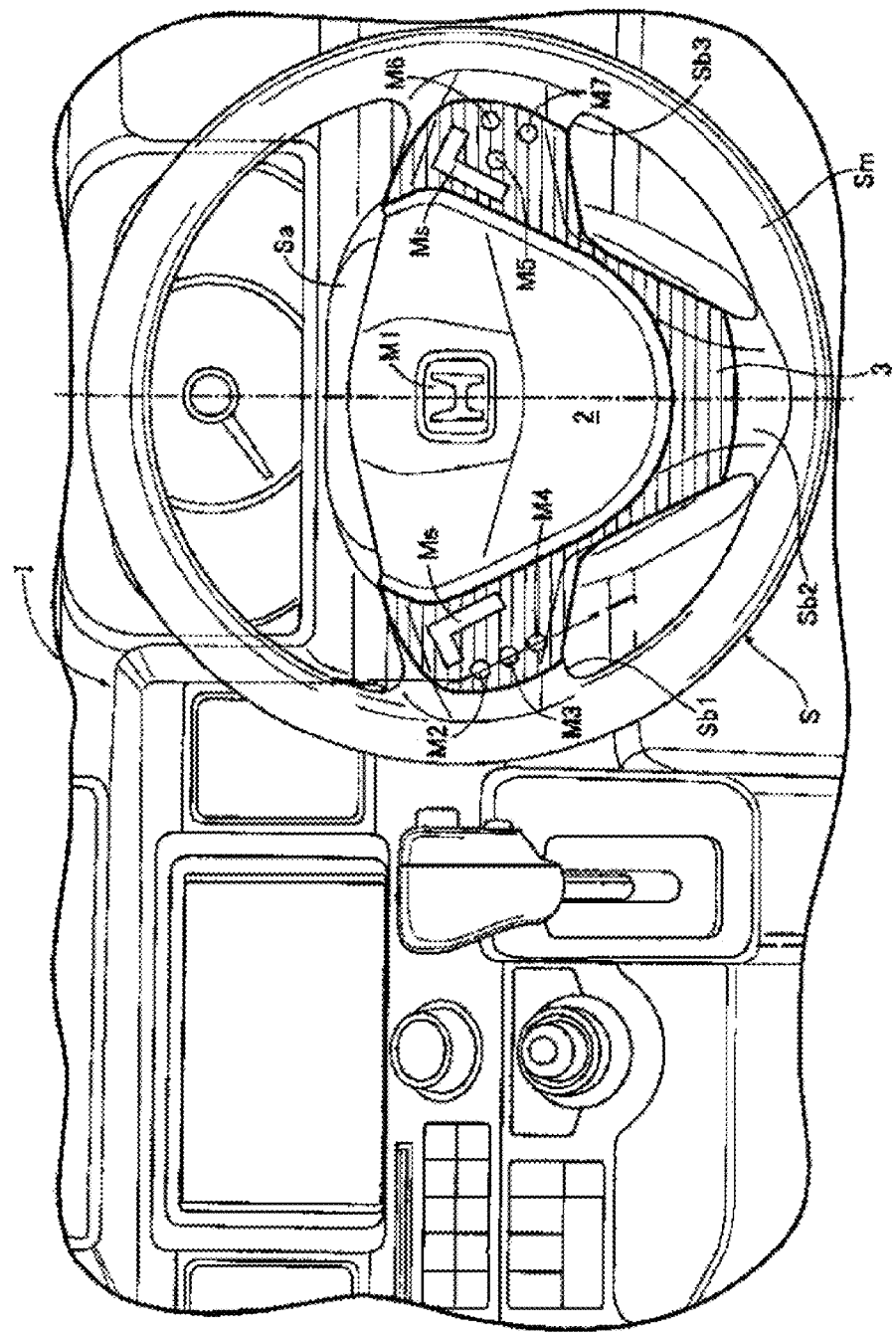
FIG. 2 is a front view around an instrument panel seen from a driver.

FIG. 1 and FIG. 2 illustrate interiors of a vehicle equipped with a gesture recognition apparatus using a steering wheel of a vehicle of the present invention. As illustrated in FIG. 1 and FIG. 2, a camera 1 as an imaging apparatus is disposed on a ceiling portion oblique rear of a driver so that a steering wheel S can be imaged. In addition, infrared irradiating means UR is disposed in the vicinity of the camera 1 to irradiate the surroundings of the steering wheel S when the interior of the vehicle is dark.

A camera used as imaging means is capable of imaging images of visible light and of infrared light, and the camera is disposed on any position capable of imaging a steering wheel S in a vehicle, not limited to the position of the camera in the embodiment illustrated in FIG. 1.

The steering wheel S being an imaging object includes a central hub portion Sa connected to a steering shaft (not shown), a rim portion Sm annularly surrounding the central hub portion Sa, and three spoke portions Sb1 to Sb3 connecting the rim portion Sm and the central hub portion Sa. The outer surface of the central hub portion Sa is detachably covered by a horn cover 2 and a designed H-shaped mark M1 is attached onto the central portion of the outer surface of the horn cover 2. The spoke portions Sb1 to Sb3 are detachably covered by a spoke cover 3 covering their outer surfaces in a stylish manner.

When the steering wheel S is in an upright position, the spoke portions Sb1 and Sb3 are symmetrically provided with L-shaped reference marks Ms, the spoke portion Sb1 is further provided with marks M2 to M4, and the spoke portion Sb3 is further provided with marks M5 to M7. In the present embodiment, an image area for obtaining a threshold of a binarizing processing performed onto an input image from a camera is determined based on positions of the reference marks Ms.

The applicant has filed a patent application for an operating apparatus of on-vehicle equipments wherein a reference mark and a mark are provided so that a position of the reference mark is recognized based on an imaging data of an imaging apparatus, and a position of the mark is specified from the position of the reference mark (unpublished).

Methods for determining an image area for obtaining a threshold is not limited to methods using reference marks, but can be based on other recognizable objects. Alternatively, an image area for obtaining a threshold can be determined beforehand.

Figure 3:
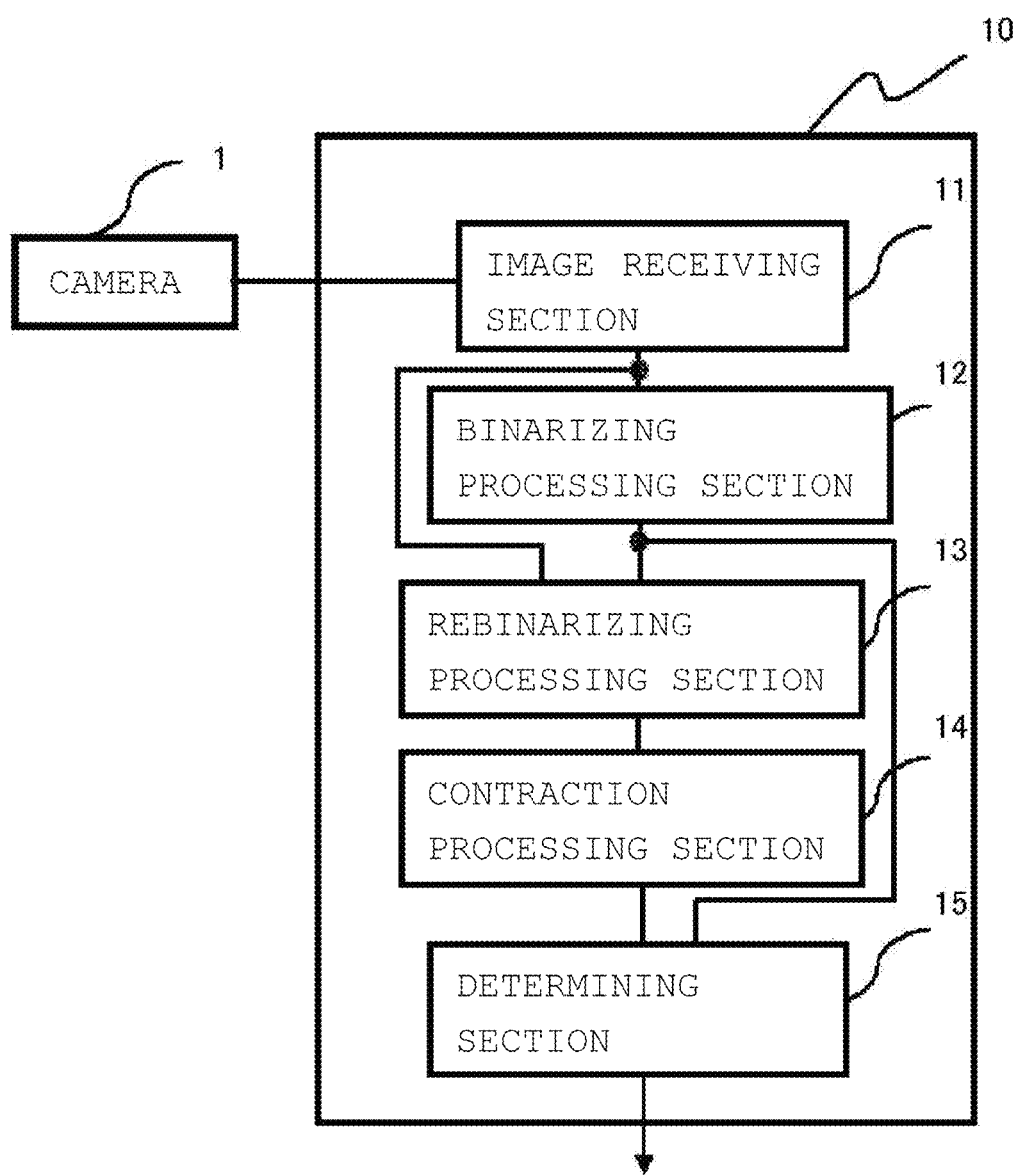
FIG. 3 is a block diagram illustrating a configuration of a hand recognizing section of the gesture recognition apparatus.

A hand recognizing section for binarizing an image data imaged by the camera 1 to recognize a hand from a binary image is described herein. FIG. 3 illustrates a hand recognizing section 10 of the gesture recognition apparatus. As illustrated in FIG. 3, the hand recognizing section 10 includes an image receiving section 11 for receiving an image data imaged by the camera 1, a binarizing processing section 12 for preparing a first binary image by binarizing an input image received from the image receiving section 11 by a predetermined method, a rebinarizing processing section 13 for preparing a second binary image by rebinarizing a predetermined area of the input image by another threshold, a contraction processing section 14 for contracting the second binary image prepared by the rebinarizing processing section 13, and a determining section 15 for determining if a hand is recognizable or not in the first binary image and in the contracted second binary image.

The image receiving section 11 has a function for receiving an image data from the camera 1. Specifically, the image receiving section 11 receives an image data with a predetermined format generated by the camera and transmits the received input image to the binarizing processing section 12.

The binarizing processing section 12 has a function for converting the input image transmitted from the image receiving section 11 into a binary image. In the present embodiment, a discriminant analysis method is applied as a method for determining a threshold for binarizing an image. Since a discriminant analysis method is a publicly known technology, a detailed description will be omitted. However, the method is, for example disclosed in "Automatic threshold selecting method based on discriminant and least square criteria", Nobuyuki Otsu, Institute of Electronics and Telecommunication Engineers Journal D, J-63, 4, p. 349, 1980.

The binarizing processing section 12 determines an area for obtaining a threshold based on the reference marks Ms on an input image, and performs a binarizing processing onto the input image with a threshold determined by a discriminant analysis method to prepare a first binary image. According to the binarizing processing on an input image, a steering wheel and a hand can be separated in the first binary image. The determining section 15 determines if the hand is recognizable or not in the first binary image prepared.

Then, the rebinarizing processing section 13 determines another threshold for only binarizing a predetermined area of the input image transmitted from the image receiving section 11, and rebinarizes a predetermined area of the binary image prepared by the binarizing processing section 12 to prepare a second binary image. While the steering wheel and the hand are separated in the binary image in the binarizing processing section 12, a rebinarizing processing is performed here for the purpose of merging the back of the hand and each finger in case that each finger is separated from the back of the hand depending on lighting conditions.

A method for determining another threshold in the rebinarizing processing section 13 determines a possible area wherein the hand will appear during making a gesture (operation) and another possible area wherein the background will appear during making a gesture (operation) based on the reference marks Ms on the input image. Then, these areas are merged into one image and a threshold is determined using a discriminant analysis method.

Furthermore, a predetermined area for performing a rebinarizing processing is preferably a minimum necessary area for performing a rebinarizing processing, and its determining method can be determined based on the reference marks Ms on the input image. For example, the area used for determining another threshold described above is presumed to be the area with the boundary of the hand and the background. Therefore, it is highly likely that the back of the hand and each finger can be merged by only rebinarizing these areas. A processing load of the apparatus can be suppressed by only rebinarizing a minimum necessary area.

The contraction processing section 14 performs a contraction processing on the second binary image prepared in the rebinarizing processing section 13. Since the steering wheel being the background and the hand are easily merged at rebinarization, the contraction processing on the rebinarized second binary image can relax merging of the steering wheel and the hand. The paragraph 0014 of Japanese Patent No. 3025365 discloses an example of a contraction processing.

The determining section 15 determines if a hand is recognizable or not in the first binary image and in the second binary image contracted in the contraction processing section 14, and determines that the hand is recognizable when the hand is recognized at least in one of the images.

Figure 4:
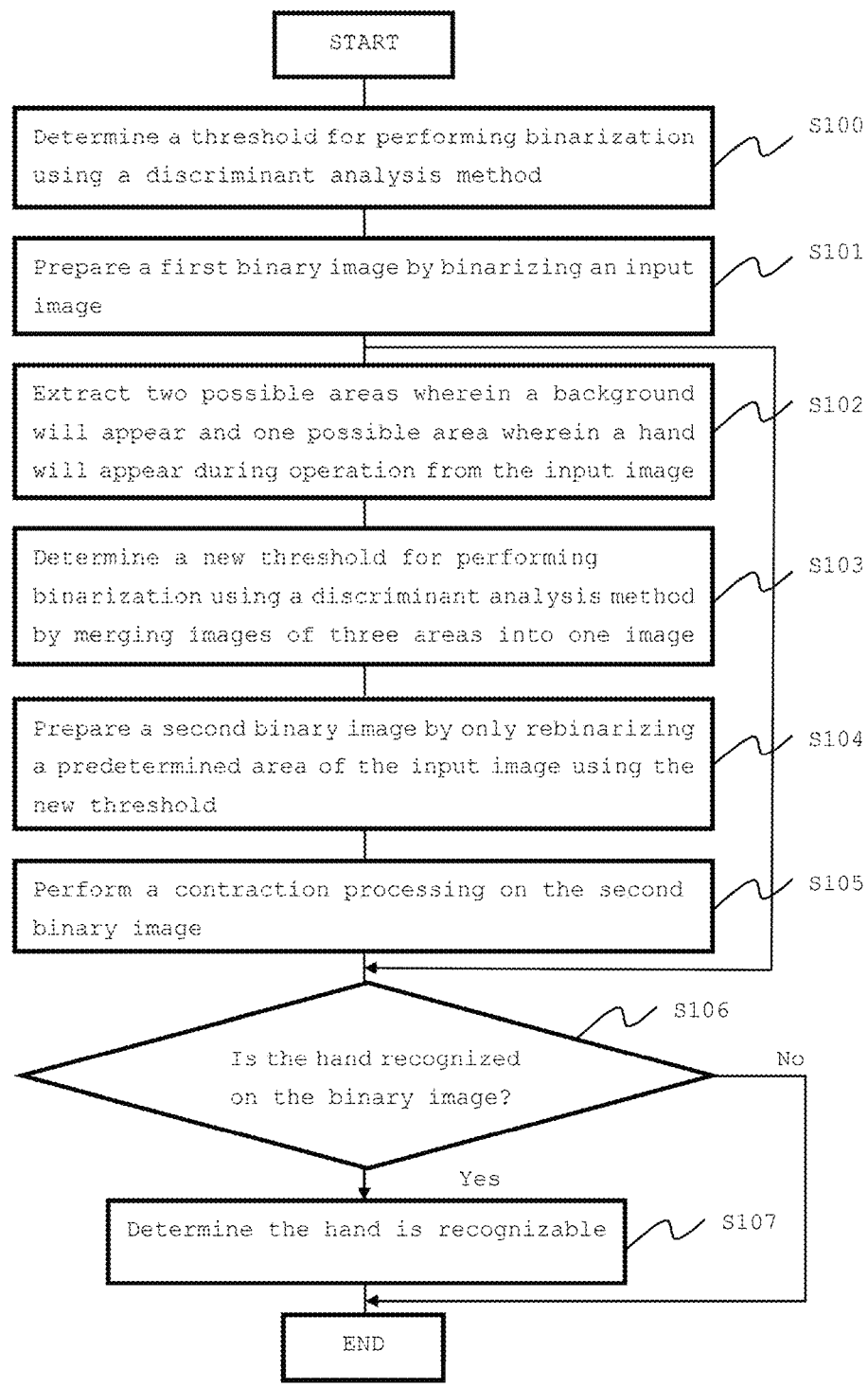
FIG. 4 is a flowchart illustrating a hand recognition processing method.

A hand recognition processing method of the gesture recognition apparatus is described herein. FIG. 4 illustrates a flowchart of the hand recognition processing method. In the hand recognition processing method, a first binary image is prepared by performing a binarizing processing using a discriminant analysis method onto the input image, and then a second binary image is prepared by only rebinarizing a predetermined area.

A first binary image is prepared at first. A threshold for performing a binarizing processing to an input image imaged by a camera is determined using a discriminant analysis method (S100).

Figure 5:
FIGS. 5A to 5C illustrate an example of an image processing in hand recognition processing.
Figure 5:
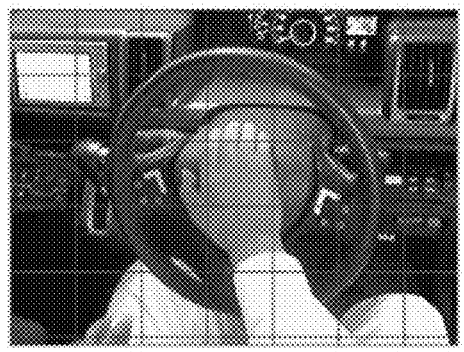
Figure 5:

FIGS. 5A to 5C illustrate an example of an image processing for preparing a first binary image. FIG. 5A illustrates an input image from a camera, FIG. 5B illustrates blocks for determining a threshold for performing a binarization, and FIG. 5C illustrates a binary image after a binarizing processing is performed. As illustrated in FIG. 5B, the input image from the camera is divided into blocks of a predetermined size, and each block is analyzed by a discriminant analysis method to determine a threshold.

Then, a binary image is prepared by binarizing the input image according to the determined threshold (S101). In the embodiment illustrated in FIGS. 5A to 5C, the input image in FIG. 5A is binarized to prepare the binary image in FIG. 5C. The back of the hand turns black and classified as a background in the binary image illustrated in FIG. 5C.

Then, a second binary image is prepared. One possible area wherein the hand will appear during making a gesture (operation) and two possible areas wherein the background will appear during making a gesture (operation) are determined on the input image wherein the first binary image was prepared (S102). These three areas can be determined based on the reference marks Ms in FIG. 2. Although one possible area wherein the hand will appear and two possible areas wherein the background will appear are determined in the present embodiment, those areas can be any number and are properly determined.

Figure 6:
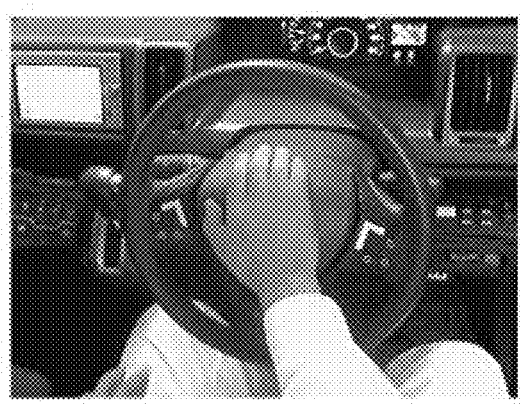
FIGS. 6A to 6D illustrate an example of an image processing in hand recognition processing.
Figure 6:
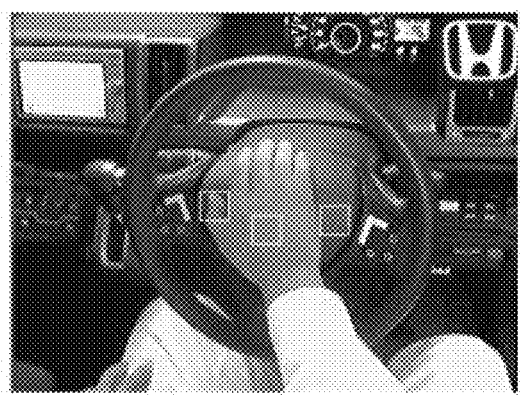
Figure 6:
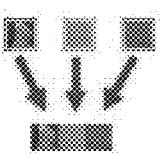
Figure 6:

FIGS. 6A to 6D illustrate an example of an image processing for forming a second binary image by performing a rebinarizing processing. FIG. 6A illustrates an input image from a camera, FIG. 6B illustrates blocks for determining a threshold for performing a rebinarization, FIG. 6C illustrates the images of the blocks for determining a threshold merged into a single image, and FIG. 6D illustrates a binary image after a binarizing processing is performed. Of the three areas illustrated in FIG. 6B, the possible area wherein the hand will appear is determined as a central block on the central hub portion Sa, and the possible areas on the central hub portion Sa wherein the background will appear during operation are determined as the nearby blocks of the reference marks Ms.

As illustrated in FIG. 6C, the images of the three blocks are merged into a single image to determine a new threshold by performing a discriminant analysis method (S103). Then, a predetermined area of the input image is rebinarized by the new threshold to prepare a second binary image (S104). As illustrated in FIG. 6D, the back of the hand is classified into white in the second binary image after rebinarization. Then, a contraction processing is performed on the second binary image (S105). Next, it is determined if the hand can be recognized in the first binary image and in the contracted second binary image (S106). The hand is determined to be recognizable if the hand can be recognized in the first binary image and/or in the second binary image (S107).

While the back of the hand turns black and it is determined that the hand cannot be recognized in the first binary image in FIG. 5C, the hand is classified into white and it is determined that the hand is recognizable in the example of the rebinarized image in FIG. 6D. Accordingly, the hand can be recognized in one of the images, and thereby the hand is determined to be recognizable.

Figure 7:
FIGS. 7A to 7C illustrate an example of an image processing in hand recognition processing.
Figure 7:
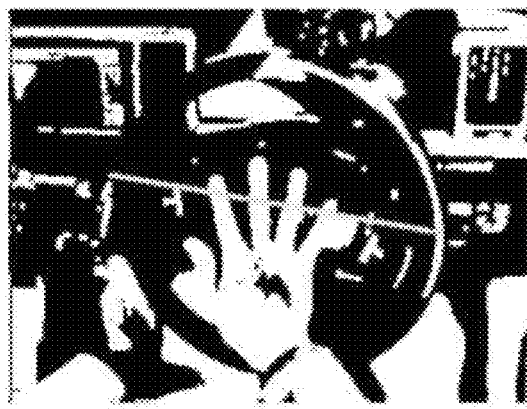
Figure 7:
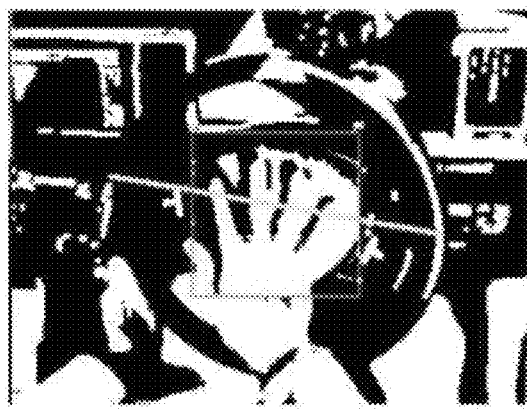

FIGS. 7A to 7C illustrate another example of an image processing of a hand recognition processing. FIG. 7A illustrates an input image from a camera wherein the hand is lighted from the right rear side. FIG. 7B illustrates a first binary image applied by a discriminant analysis method, and FIG. 7C illustrates a second binary image after a minimum necessary area is rebinarized and a contraction processing is performed.

As illustrated in FIG. 7B, the hand is classified into white and the portion of the steering wheel S is classified into black. Specifically, the hand is determined to be recognizable in the first binary image in FIG. 7B. Meanwhile, the horn portion 2 is classified into white due to the rebinarizing processing, and the fingers and the surface of the airbag are merged. However, the index finger and the horn portion 2 can be separated by performing a contraction processing, making the index finger thinner in the second binary image in FIG. 7C.

While a discriminant analysis method is applied as a method for determining a threshold of binarization in the embodiment described above, a hand recognition can also be performed by preparing a binary image through the same processing procedures applying other methods for determining a threshold of binarization. Moreover, the thresholds for performing the first binarization and for performing the rebinarization are both determined by the discriminant analysis method in the embodiment described above, however, those thresholds can be each determined by different methods. For example, the same processing procedures as described in the embodiment above can provide the same effect even if the first threshold was determined by an adaptive binarizing processing and the threshold for performing rebinarization was determined by a discriminant analysis method. The paragraph 0037 of Japanese Patent No. 4405942 discloses an example of an adaptive binarizing processing.

The present invention has been described according to the embodiments illustrated in the figures, however, these are only illustrative, and one skilled in the art will understand that various modifications and alterations may be made without departing from the scope and spirit of the present invention. Accordingly, the scope of the present invention should not be defined by the described embodiments, but should be defined by the technical spirit described in the claims.

What is claimed is:

1. A gesture recognition apparatus using a steering wheel of a vehicle, the gesture recognition apparatus including imaging means disposed on a position capable of imaging a steering wheel and recognizing means for recognizing a position of a hand on the steering wheel based on an imaging data outputted from the imaging means, the steering wheel having a reference mark provided thereon;

the recognizing means including a computer comprising:

binarizing means for preparing, by the computer, a first binary image by binarizing the imaging data outputted from the imaging means by a predetermined method;

rebinarizing means for preparing, by the computer, a second binary image, based on the position of said reference mark, by determining a first possible area at a center of the steering wheel wherein the hand is imaged during making a gesture and a second possible area near the reference mark wherein a background is imaged during making a gesture on the imaging data, merging the first possible area and the second possible area into one image, determining a new threshold using the one image by a predetermined method, and rebinarizing a predetermined area of the imaging data with the new threshold; and determining means for determining, by the computer, the hand as being recognizable if the hand can be recognized in the first binary image and/or in the second binary image.

2. The gesture recognition apparatus using a steering wheel of a vehicle according to claim 1, further comprising contraction processing means for performing, by the computer, a contraction processing on the second binary image.

3. The gesture recognition apparatus using a steering wheel of a vehicle according to claim 1, wherein the predetermined method in the binarizing means is a discriminant analysis method or an adaptive binarizing processing.

4. The gesture recognition apparatus using a steering wheel of a vehicle according to claim 1, wherein the predetermined method in the rebinarizing means is a discriminant analysis method.

5. A method for recognizing a hand on a steering wheel of a vehicle based on an imaging data outputted from imaging means disposed on a position capable of imaging the steering wheel during making a gesture using the steering wheel, the steering wheel being provided with a reference mark thereon, the method comprising the steps of:

preparing, by a computer, a first binary image by performing a binarizing processing on an imaging data outputted from the imaging means by a predetermined method;

preparing, by the computer, a second binary image, based on the position of said reference mark, by determining, by the computer, a first possible area at a center of the steering wheel wherein the hand is imaged during making a gesture and a second possible area near the reference mark wherein a background is imaged during making a gesture on the imaging data, merging, by the computer, the first and the second area into one image, determining, by the computer, a new threshold using the one image by a predetermined method, and rebinarizing, by the computer, a predetermined area of the imaging data with the new threshold; and determining, by the computer, the hand as being recognizable if the hand can be recognized in the first binary image and/or in the second binary image.

6. The method for recognizing a hand according to claim 5, further comprising a step of performing, by the computer, a contraction processing on the second binary image.

7. The method for recognizing a hand according to claim 5, wherein the predetermined method in the step of preparing the first binary image is a discriminant analysis method or an adaptive binarizing processing.

8. The method for recognizing a hand according to claim 5, wherein the predetermined method in the step of preparing the second binary image is a discriminant analysis method.

9. The gesture recognition apparatus using a steering wheel of a vehicle according to claim 2, wherein the predetermined method in the binarizing means is a discriminant analysis method or an adaptive binarizing processing.

10. The method for recognizing a hand according to claim 6, wherein the predetermined method in the step of preparing the first binary image is a discriminant analysis method or an adaptive binarizing processing.

11. The method for recognizing a hand according to claim 6, wherein the predetermined method in the step of preparing the second binary image is a discriminant analysis method.

12. The method for recognizing a hand according to claim 7, wherein the predetermined method in the step of preparing the second binary image is a discriminant analysis method.

* * * * *